United States Patent
Ferguson

(10) Patent No.: US 6,304,861 B1
(45) Date of Patent: *Oct. 16, 2001

(54) ASYNCHRONOUS NETWORK COLLABORATION METHOD AND APPARATUS

(75) Inventor: Bradley Ferguson, Palo Alto, CA (US)

(73) Assignee: Recipio, Inc., San Mateo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,143

(22) Filed: Oct. 12, 1999

Related U.S. Application Data

(63) Continuation of application No. 08/657,984, filed on Jun. 4, 1996, now Pat. No. 5,995,951.

(51) Int. Cl.[7] .................................................. G06E 1/00
(52) U.S. Cl. .............................. 706/10; 706/11; 706/15
(58) Field of Search .............................. 706/10, 11, 925, 706/15, 23; 707/500, 530, 531; 705/12

(56) References Cited

U.S. PATENT DOCUMENTS

| 4,023,729 | * | 5/1977 | Eaton ...................................... 235/52 |
| 4,789,928 | | 12/1988 | Fujisake ................................. 364/401 |
| 5,136,501 | | 8/1992 | Silverman ............................. 364/408 |

(List continued on next page.)

OTHER PUBLICATIONS

Ramesh et al. "A multi layer client server queueing network model with synchronous and asynchronous messages", ACM WOSP, pp 107–119, 1998.*

Moitz et al, "LoGPC modeling network contention in message passing programs", ACM SIGMETRICS, pp 254–263, Mar. 1998.*

Aiello et al, "Approximate load balancing on dynamic and asynchronous networks", ACM STOC, pp 632–641, Jul. 1993.*

(List continued on next page.)

*Primary Examiner*—Kakali Chaki
*Assistant Examiner*—Anil Khatri
(74) *Attorney, Agent, or Firm*—Townsend and Townsend and Crew

(57) ABSTRACT

A method implemented on a network of computers for allowing a plurality of users to collaborate in decision making to solve a problem, includes the steps of processing, at a central server, a group of proposals for solving the problem, submitting the group of proposals to the plurality of users at remote clients, and thereafter receiving, at the central server from the plurality of users, selections of proposals from the group of proposals. Determining, at the central server, a narrowed group of proposals in response to the selections of proposals, communicating the narrowed group of proposals to the plurality of users at the remote clients, each proposal in the narrowed group of proposals including sets of statements, and thereafter receiving, at the central server from one of the plurality of users, suggestions for modifying proposals in the narrowed group of proposals, are also included. The method also included determining, at the central server, a modified narrowed group of proposals in response to the suggestions, each proposal in the modified narrowed group of proposals including a modified set of statements, submitting the modified narrowed group of proposals to the plurality of users at remote clients, thereafter receiving, at the central server from the plurality of users, selections of statements from the modified sets of statements of the modified narrowed group of proposals, and consolidating the selection of statements into a proposed solution for the problem.

28 Claims, 8 Drawing Sheets

U.S. PATENT DOCUMENTS

| | | | |
|---|---|---|---|
| 5,167,011 | | 11/1992 | Priest ................................. 395/54 |
| 5,195,031 | | 3/1993 | Ordish ............................... 364/403 |
| 5,225,978 | * | 7/1993 | Petersen et al. ..................... 705/33 |
| 5,243,515 | | 9/1993 | Lee .................................... 364/401 |
| 5,375,055 | | 12/1994 | Togher ............................... 364/408 |
| 5,400,248 | * | 3/1995 | Chisholm ............................ 705/12 |
| 5,442,788 | * | 8/1995 | Bier .................................... 345/344 |
| 5,511,187 | * | 4/1996 | Cragun ................................. 707/8 |
| 5,528,281 | | 6/1996 | Grady ................................... 348/7 |
| 5,548,506 | * | 8/1996 | Srinivasan ............................ 705/8 |
| 5,557,726 | * | 9/1996 | Yoshizawa .......................... 345/330 |
| 5,561,811 | | 10/1996 | Bier .................................... 395/825 |
| 5,586,252 | * | 12/1996 | Barnard et al. ...................... 714/48 |
| 5,671,428 | * | 9/1997 | Muranaga et al. .................. 345/329 |
| 5,689,641 | * | 11/1997 | Ludwig et al. ...................... 709/241 |
| 5,765,038 | * | 6/1998 | Flannery et al. ..................... 707/10 |
| 5,790,847 | * | 8/1998 | Fisk et al. ............................ 380/24 |
| 5,930,780 | * | 7/1999 | Hughes et al. ....................... 706/13 |
| 5,937,397 | * | 8/1999 | Callaghan ............................ 706/10 |
| 5,950,217 | * | 9/1999 | Heinlein et al. ..................... 707/530 |
| 5,985,459 | * | 4/1999 | Enomoto .............................. 706/10 |
| 5,995,951 | * | 11/1999 | Fergusan .............................. 706/10 |
| 6,018,716 | * | 1/2000 | Denardo et al. ........................ 705/7 |
| 6,049,792 | * | 4/2000 | Hart et al. ............................ 706/10 |
| 6,078,902 | * | 6/2000 | Schenkler ............................. 705/35 |
| 6,192,354 | * | 2/2001 | Bigus et al. .......................... 706/45 |

OTHER PUBLICATIONS

Siegel et al, "Automatic technology mapping for generalized fundamental mode asynchronous designes", IEEE Design Automation Conf. pp 61–67, Jan. 1993.*

Gail Kay, "Effective Meetings through Electronic Brainstorming," Journal of Management Development, 1995, vol. 14, No. 6, pp. 4–25.*

W.B. Martz, Jr. "GroupSystems 4.0: An Electronic Meeting System," Proceedings of the Twenty–Fourth Annual Hawaii International Conference on System Sciences, 1991, vol. 3, pp. 799–804, Jan. 1991.*

Xun Qu et al., "Considerations in Running TCP/IP–Based Networks over the X.25 Public Data Network," Proceedings of IEEE Singapore International Conference on Networks, 1995, pp. 379–383, Jul. 1995.*

S. Vuong et al., "Mobile Intelligent Agent Systems: WAVE vs. JAVA," Proceedings of the First Annual Conference on Emerging Technologies and Applications in Communications, 1996, pp. 196–199, May 1995.*

Bob Metcalf, "From dating to voting collaborative filtering will make our choices earlier," Info World, Mar. 18, 1996.

Council, Advertisement, Feb. 2, 1997, download Apr. 25, 1997.

Julian Dibbell, "Two Approaches, Top Down and Bottom Up, Represent an Almost Theological Schism in Computer Science," Time, Mar. 25, 1996, pp. 55–58.

Paul C. Judge, "Artificial Imagination," Business Week, Mar. 18, 1996, p. 60.

Qu, "Considerations in running tcp/ip based networks over the x.25 public data network", Information engineering, IEEE Singapore International conference on networks, P379.

Vuong, "Mobile intelligent agent systems: wave vs. java", Emerging technologies and applications in communication, 1996 conference IEEE, p. 196.

Collet, "What does a public data internet do?", Computer software and application conferences, 1992 Compsac IEEE, p. 283.

Gehrlein, "The Condorcet Criterion", Mathematical Social Sciences 10(1995) 199–209.

* cited by examiner

Resolution

Project Name

Security
Problem-solving Process
☐ anonymous
☐ authored
360° Project Report
 Level 1 ☐  Level 2 ☐  Level 3 ☐

☐ Participants
Time allowed for proposal process & ranking process
☐ Hours
☐ Minutes

ASYNCHRONOUS NETWORK COLLABORATION METHOD AND APPARATUS

"This application is a continuation of and claims the benefit of U.S. application Ser. No. 08/657,984, filed Jun. 4, 1996, now U.S. Pat. No. 5,995,951 the disclosure of which is incorporated by reference."

BACKGROUND OF THE INVENTION

The present invention relates to network collaboration. More specifically, the present invention relates to methods and apparatus for enabling network resource groups to collaborate in decision making. Network resource groups include groups of users interconnected by a common computer network.

Current approaches to problem solving have focused upon decision making by individuals or have focused upon the principles of discovery and intuition in order to create solutions. Such approaches typically guide the user through a series of steps that focus the user's attention upon conceptual solutions the user may be overlooking. For example, one approach identifies contradictions between objectives within a user's project and highlights them to the user, another approach uses word association games to attempt to spur creativity in the user, another presents unexpected scenarios to the user to attempt to stimulate creative solutions from the user, yet another utilizes neural networks to attempt to generate alternative solutions to the user, and yet others guide the user to make decisions based upon options and criteria set by the user. Each of these approaches attempt to aid the user in solving problems. None of these approaches, however aid groups of users in making decisions about which solution among possible solutions to a problem should be used.

What is needed are methods and apparatus for enabling groups of users to collaborate in decision making.

SUMMARY OF THE INVENTION

The present invention discloses methods and apparatus for enabling groups of users to collaborate in decision making.

According to one embodiment of the present invention a method implemented on a network of computers for allowing a plurality of users to collaborate in decision making to solve a problem, includes the steps of processing, at a central server, a group of proposals for solving the problem, submitting the group of proposals to the plurality of users at remote clients, and thereafter receiving, at the central server from the plurality of users, selections of proposals from the group of proposals. The method also includes the steps of determining, at the central server, a narrowed group of proposals in response to the selections of proposals, communicating the narrowed group of proposals to the plurality of users at the remote clients, each proposal in the narrowed group of proposals including sets of statements, and thereafter receiving, at the central server from one of the plurality of users, suggestions for modifying proposals in the narrowed group of proposals. The steps of determining, at the central server, a modified narrowed group of proposals in response to the suggestions, submitting the modified narrowed group of proposals to the plurality of users at remote clients, each proposal in the modified narrowed group of proposals including a modified set of statements and thereafter receiving, at the central server from the plurality of users, selections of statements from the modified sets of statements of the modified narrowed group of proposals are also included. The method also includes the step of consolidating the selection of suggestions into a final proposed solution for the problem.

According to another embodiment of the present invention a computer system including a computer program for allowing a plurality of users to collaborate in decision making of a problem, includes a computer-readable memory including: code that processes a group of proposals for solving the problem, code that submits the group of proposals to the plurality of users at remote clients, and code that receives selections of proposals from the group of proposals. The computer-readable memory also includes code that determines, at the central server, a narrowed group of proposals in response to the selections of proposals, code that communicates the narrowed group of proposals to the plurality of users at the remote clients, each proposal in the narrowed group of proposals including sets of statements, and code that receives suggestions for modifying proposals in the narrowed group of proposals. Code that determines, at the central server, a modified narrowed group of proposals in response to the suggestions, code that submits the modified narrowed group of proposals to the plurality of users at remote clients, each proposal in the modified narrowed group of proposals including a modified set of statements, and code that receives selections of statements from the modified sets of statements of the modified narrowed group of proposals are also included. The computer-readable memory also includes code that consolidates the selection of suggestions into a working proposal for the problem.

According to yet another embodiment of the present invention, a computer system configured to allow a plurality of users to collaborate in decision making, includes a processor for processing a group of proposals for solving a problem, first submission means for submitting the group of proposals to the plurality of users at remote clients, and a first receiver for receiving, from the plurality of users, selections of proposals from the group of proposals. The computer system also includes first determining means for determining, a narrowed group of proposals in response to the selections of proposals, a communicator for communicating the narrowed group of proposals to the plurality of users at the remote clients, each proposal in the narrowed group of proposals including sets of statements, and a second receiver for receiving, from one of the plurality of users, suggestions for modifying proposals in the narrowed group of proposals. Second determining means for determining, a modified narrowed group of proposals in response to the suggestions, second submission means for submitting the modified narrowed group of proposals to the plurality of users at remote clients, each proposal in the modified narrowed group of proposals including a modified set of statements,and a third receiver for receiving, from the plurality of users, selections of statements from the modified sets of statements of the modified narrowed group of proposals are also included. The computer system also includes consolidating means for consolidating the selection of suggestions into a network collaboration solution for the problem.

Further understanding of the nature and advantages of the invention may be realized by reference to the remaining portions of the specification and drawings.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF SPECIFIC EMBODIMENTS

Definitions

Research network collaboration device—a mechanical, electronic, or computational device which manages the communication and collaboration process between members of a research network and retains the information produced by a research network.

Research network—a group of people or groups collaborating in the solution of a problem or explanation of phenomena.

Statement—the elements out of which proposals are constructed. Statements may be text as in a natural language, symbolic formulae (such as logical formulae, mathematical formulae, or computer code or computational formulae is any computer language), musical notation, sound recordings or other musical or audio format, or images (such as line drawings, graphical designs, photographs, video images or recordings, or motion pictures of any sort). Statements may also be commands to execute other computer programs or to use and control peripheral devices coupled to the computer system.

Proposal—group of one or more typically separate and identifiable statements which contribute to: a solution of a problem, an explanation of specified phenomena, or a creation of a desired collaborative product.

Compilation—selection of one or more statements from one or more proposals into a list for use in constructing a new proposal(s).

Crossover—the combination of one or more compiled statements to form a new proposal Ranking—placing a list of proposals or statements into a list in descending order from best to worst in its fitness to solve a problem or explain phenomena and selecting a predetermined number of these proposals or ideas to be used in the combinatorial process of creating new proposals or in creating a synthesis.

Synthesis—selecting a predetermined number of ideas from a predetermined number of proposals and placing them in a rank ordered list according to their fitness to solve a problem or explain phenomena.

Round—a round is a process of presenting proposals to members of a research network, compiling statements from the proposals presented, creating new proposals through crossover, and ranking proposals or statements to determine which proposals will proceed to the next round of consideration.

Research project—a collaborative process by members of a research network designed to solve a particular problem or explain particular phenomena which consists of round one, round two, round three, and a synthesis.

Research network member—a person or group of people that is a member of the research network.

Research team—members of a research network who collaborate to make a proposal.

System Overview

Figure 1:
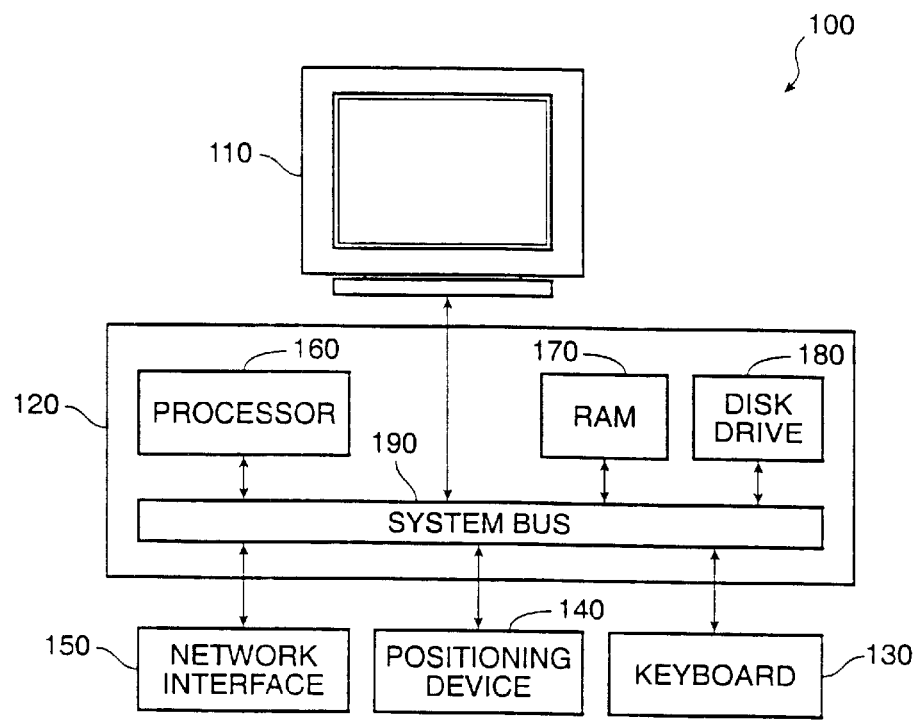
FIG. 1 is a block diagram of a system according to a preferred embodiment of the present invention.

FIG. 1 is a block diagram of a system 100 according to a preferred embodiment of the present invention. System 100 includes a monitor 110, a computer 120, a keyboard 130, a mouse 140, and a network interface 150. Computer 120 includes familiar computer components such as a processor 160, and memory storage devices, such as a random access memory (RAM) 170, a disk drive 180 (optional), and a system bus 190 interconnecting the above components.

A mouse is but one example of a graphical input device, also known as a pointing device, a digitizing tablet is another. RAM 170 and disk drive 180 are examples of tangible media for storage of computer programs, other types of tangible media include floppy disks, removable hard disks, optical storage media such as CD-ROMS and bar codes, semiconductor memories such as flash memories, read-only-memories (ROMS), ASICs, battery-backed volatile memories, and the like. Network interface 150 enables the user to communicate with other users in the decision making process.

In a preferred embodiment, System 100 includes a 586-based IBM-compatible computer, running Windows95 operating system, or a PowerPC-based MAC-compatible computer, running MacOS, a JAVA (TM) interpreter, such as HOT JAVA (TM) from Sun Microsystems, and Resolution (TM) software from the inventor.

FIG. 1 is representative of but one type of system for embodying the present invention. It will be readily apparent to one of ordinary skill in the art that many system types and configurations are suitable for use in conjunction with the present invention, such as Workstations, "Network Computers" ("$500 Internet Boxes"), and other current and future Java (TM), or other cross-platform language supported systems.

Figure 2:
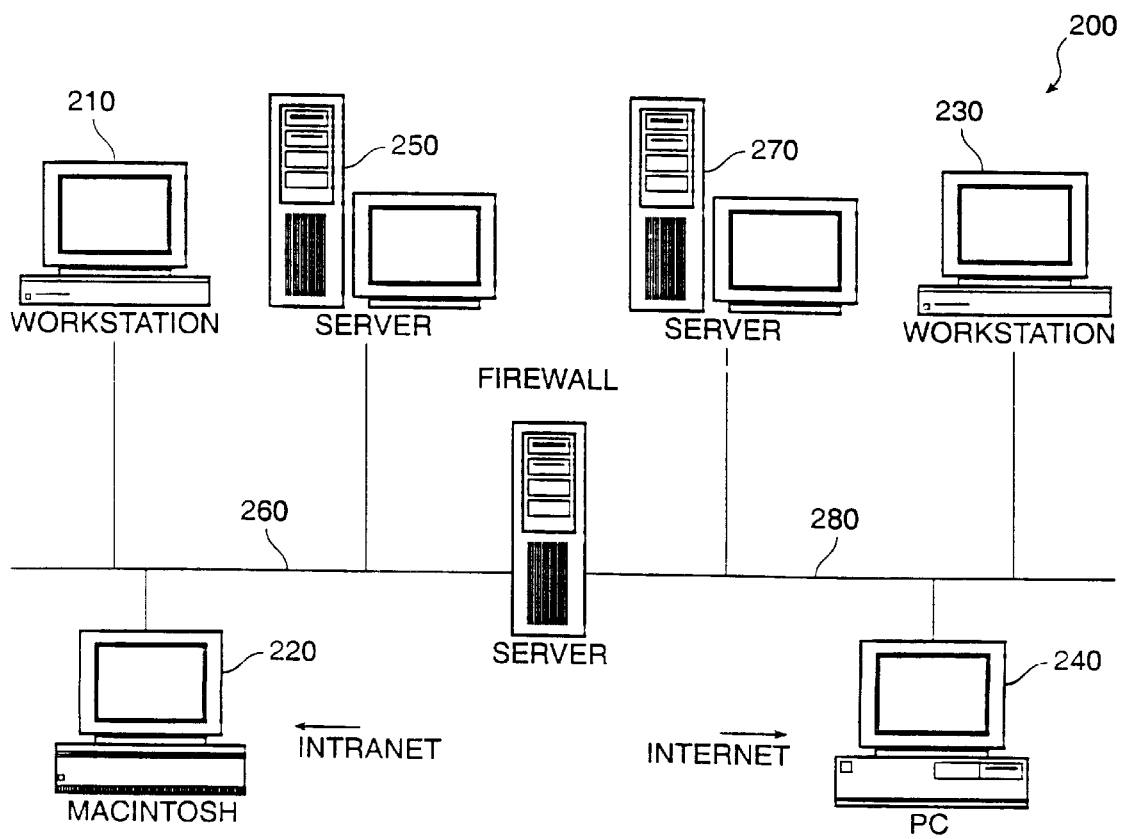
FIG. 2 is a block diagram of a network according to a preferred embodiment of the present invention.

FIG. 2 is a block diagram of a network 200 according to a preferred embodiment of the present invention. FIG. 2 illustrates clients 210–240, central server 250 coupled to a network 260, and central server 270 coupled to a network 280. Each client 210–240 and central servers 250 and 270 may be a computer system as described in FIG. 1.

In the present invention, "the central server" may be a web server (central server 250) within an enterprise (Intranet, network-260) or an external web server (central server 270) external to the enterprise (Internet, network 280). In FIG. 2, either the central server 250 or central server 260 may be used in the preferred embodiment, so long as clients 210–240 have access to the web server embodying the present invention.

In alternative embodiments, the invention may be embodied on web server 250 and only be accessible to users 210 and 220. Further, an embodiment may be embodied on web server 270 and only be accessible to users 230 and 240.

FIG. 2 is representative of but one type of network for embodying the present invention. It will be readily apparent to one of ordinary skill in the art that many other network configurations are suitable for use in conjunction with the present invention.

Detailed Description

Figure 3:
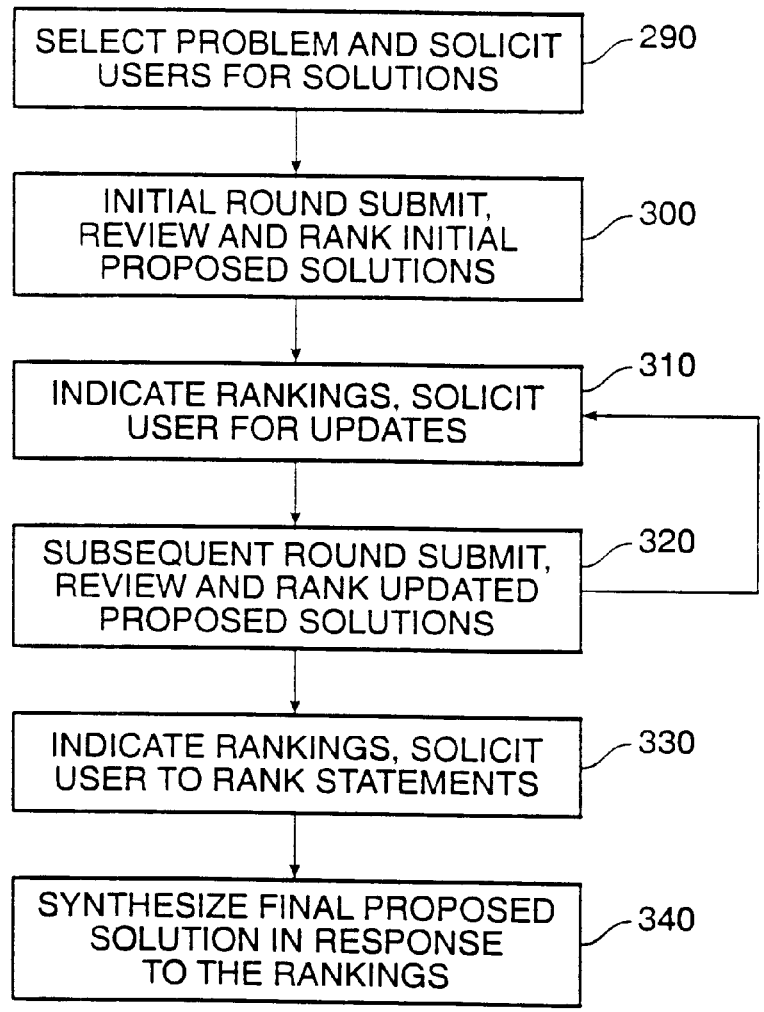
FIG. 3 illustrates a flow diagram of the preferred embodiment of the present invention.

FIG. 3 illustrates a flow diagram of the preferred embodiment of the present invention. FIG. 3 includes steps 290–340.

Initially a user selects a problem to be solved and solicits initial proposed solutions from a group of network users, step 290. These proposed solutions, like subsequent proposals, include a number of statements. The network users are preferably coupled to an intranet or by the Internet, as previously described.

Next, in an "Initial round," the network users submit, review, and rank the initial proposed solutions, step 300. A certain number of the initial proposed solutions are then selected for further refinement and consideration, based upon the rankings.

The selected initial proposed solutions are indicated to the network users and the network users are solicited to update particular initial proposed solutions, step 310.

Next, in a "Subsequent round," the network users submit, review, and rank the proposed solutions, step 320.

As indicated in FIG. 3, steps 310–320 may be repeated any number of times. The number of iterations may be based upon the number of initial proposals. For example, if there are a great number of initial proposals, paring down to a "manageable" number of proposals may take a few iterations. In one example, starting with five proposals, two iterations of the above steps are performed to reduce the number of proposals to two.

After the number of proposals has been reduced to a "manageable" number, typically two, the network users are solicited to rank statements from within each of the remaining proposals, step 330.

In response to the rankings, a final proposed solution is synthesized, step 340. The final proposed solution may contain any number of statements, consolidated from statements within proposals.

Figure 4:
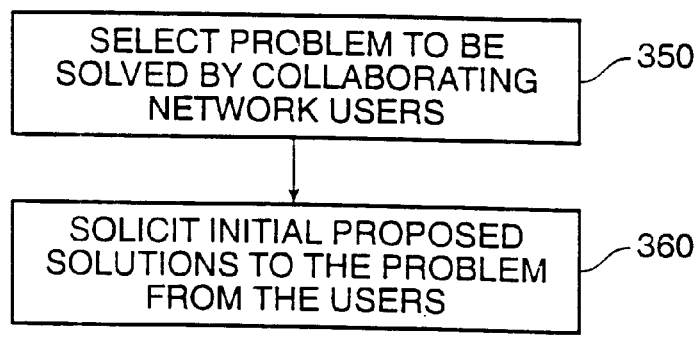
FIG. 4 illustrates a more detailed flow diagram of step 290 in FIG. 3.

FIG. 4 illustrates a more detailed flow diagram of step 290 in FIG. 3. FIG. 4 includes steps 350 and 360.

Initially, a user selects a problem to be solved by network users collaborating in decision making, step 350. The problem may be determined by an individual such as a project manager, or by other conventional means, such as a committee. Network users may be individuals or a team of users.

Next, the preferred embodiment of the present invention, embodied on a central server, solicits initial proposed solutions from the network users, embodied at remote clients, step 360. Preferably the central server solicits initial proposed solutions from the entire group of network users that will collaborate in decision making. Alternatively, however, the central server may solicit proposals from fewer than all of the network users in certain cases (e.g. only solicit proposals from a research and development group).

Figures 5, 6:
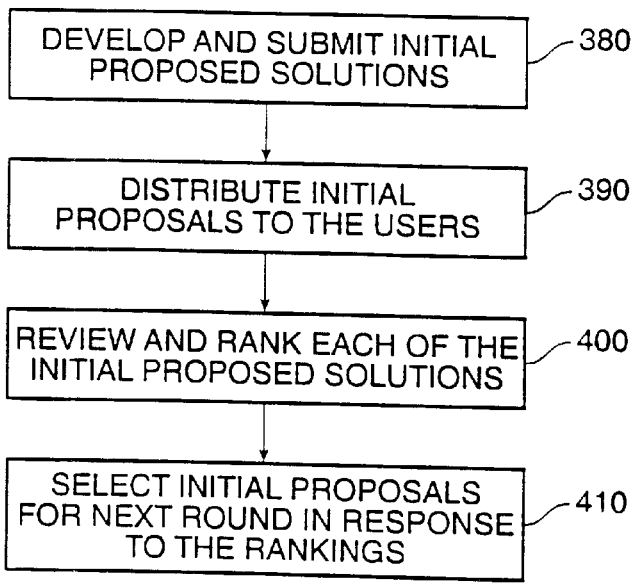
FIG. 5 illustrates a configuration screen display of an embodiment of the present invention.
FIG. 6 illustrates a more detailed flow diagram of step 300 in FIG. 3.

FIG. 5 illustrates a configuration screen display of an embodiment of the present invention.

In the preferred embodiment of the present invention, the remote clients contact the central server, which in turn loads the illustrated screen displays on the client side machine. Within this configuration screen, a decision maker defines a name for the project, and defines the number of participants in the network collaboration group. Using well-known techniques, the project manager specifies which users will participate by user name or number, with another input screen (not shown). The decision maker also specifies an amount of time given to each participant to submit proposals, to update proposals, to rank the proposals, etc, as will be further seen the attached figures.

FIG. 6 illustrates a more detailed flow diagram of step 300 in FIG. 3. FIG. 5 includes steps 380–410.

In response to the described problem, each of the network users develop and submit initial proposed solutions to the central server, step 380. The network users may be individual users of teams of users. At this stage, it is envisioned that initial proposals would typically include a brief list of points or statements, as well as supporting comments and/or justifications. Initial and subsequent proposals, however, may be in any level of detail for use in the present invention.

Figure 7:
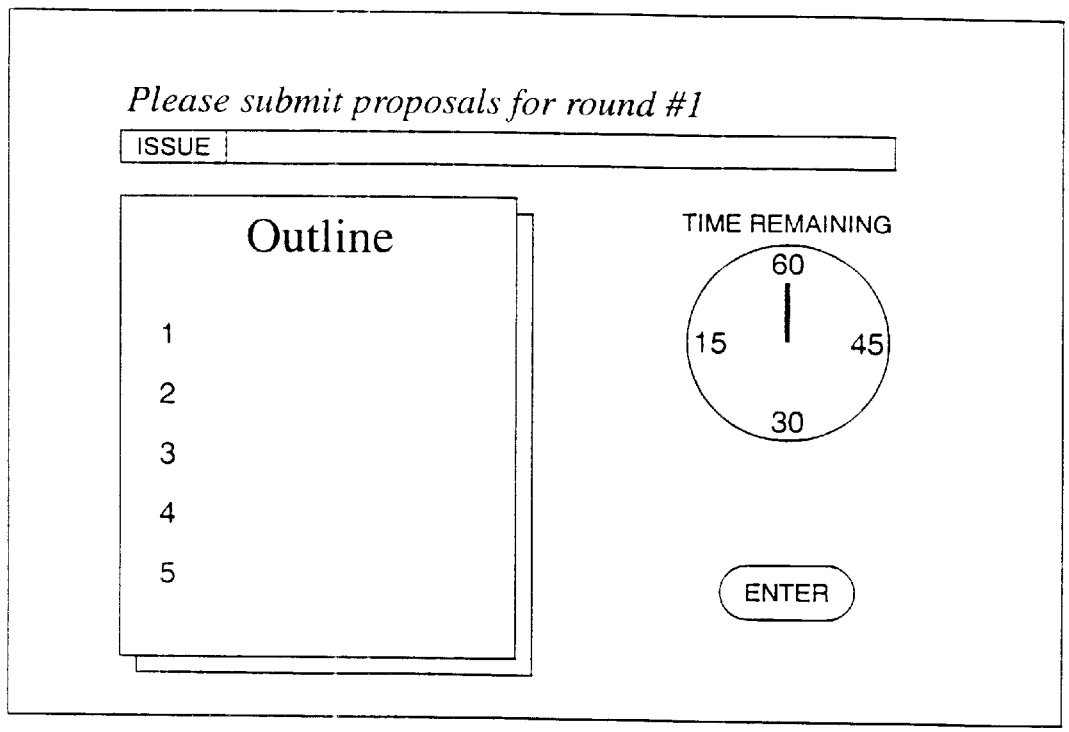
FIG. 7 illustrates a submission screen display of an embodiment of the present invention.

FIG. 7 illustrates a submission screen display of an embodiment of the present invention. As illustrated, the central server prompts the user to enter a proposal to solve the problem. Typically the user enters statements, with comments another display screen.

FIG. 7 also illustrates a time remaining clock that specifies the amount of time remaining before the proposal is due. In one embodiment of the present invention the clock is implemented as a Java-language applet.

Referring back to FIG. 6, after the users have submitted the initial proposals to the central server, the central server distributes some or all of the initial proposals to each of the users, step 390. Alternatively, the central server may notify the users that proposals are available for review at a particular location, such as a web site. The central server may use any well known notification method such as e-mail. Preferably all of the users are distributed a copy of each of the initial proposals.

Next, each user reviews and ranks each of the initial proposed solutions to the problem, step 400. Based upon the user rankings, the central server selects a number of initial proposals that will proceed to the next round, step 410. Preferably fewer than all of the proposed solutions proceed to the next "round" (step 300). Alternatively, all of the proposed solutions proceed to the next "round". It should be recognized, however, that generally the greater the number of proposed solutions that proceed to subsequent "rounds" the greater the amount of time it will take to come to a final proposed solution.

Figure 8A:
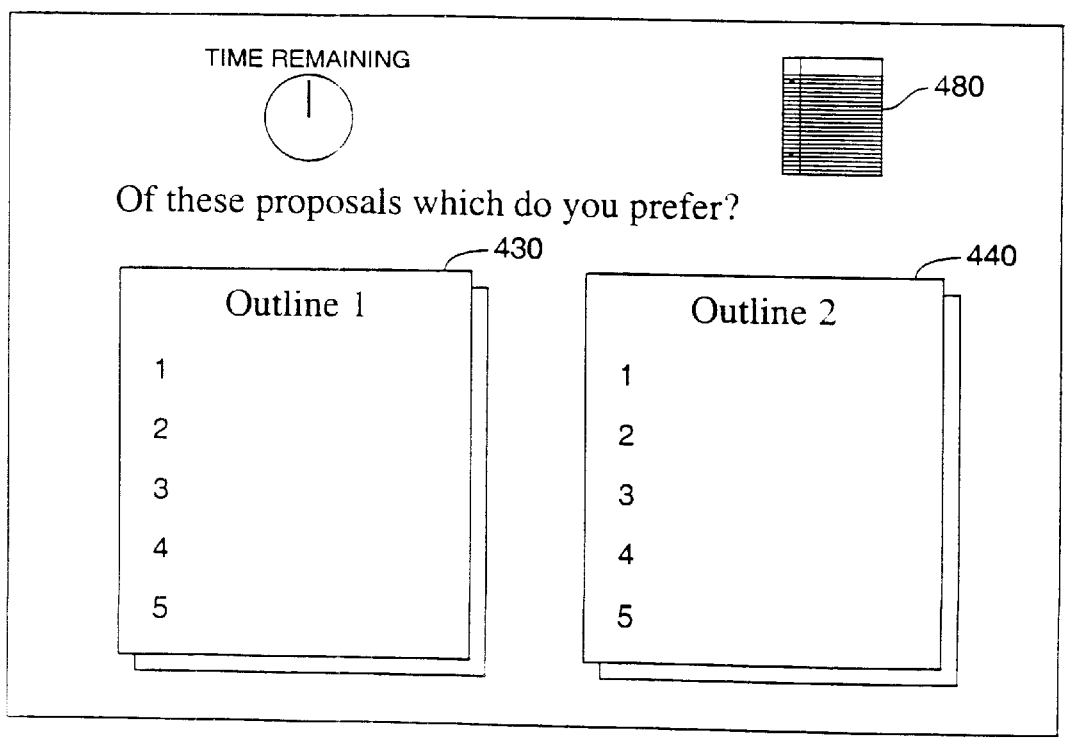
FIG. 8a and 8b illustrate comparison screen displays of a preferred embodiment of the present invention.

FIG. 8a and b illustrate comparison screen displays of a preferred embodiment of the present invention. In FIG. 8a, the central server presents a first initial proposed solution 430 next to a second initial proposed solution 440. The user obtains further detail on any of the statements in the outline by selecting the statement on the display with a conventional pointing device. The user then votes for one of the initial proposals over the other one by using the pointing device to select the preferred initial proposal.

Figure 8B:
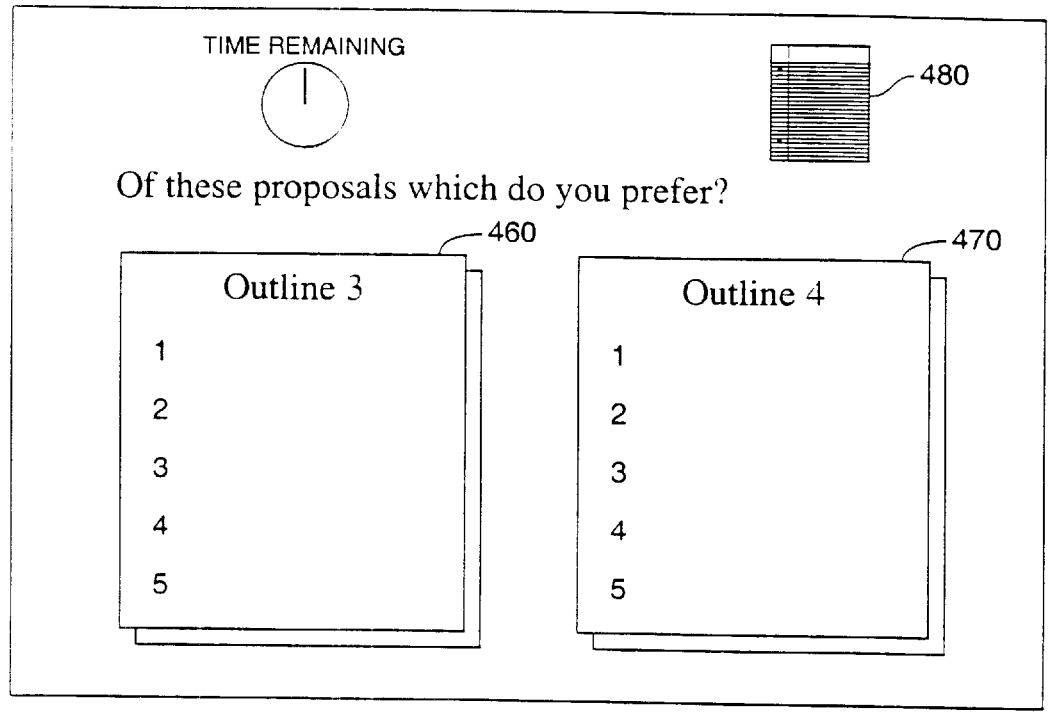

In FIG. 8b, the central server presents a third initial proposed solution 460 next to a fourth initial proposed solution 470. The central server displays pairings of the initial proposals in a round-robin fashion, until the user has indicated the user's preferences for all of the possible pairings of initial proposals.

Based upon the user's votes, the central server determines the rankings of the initial proposals. In an alternative embodiment, the central server may simply ask the user to directly assign a ranking to each of the proposed solutions, without the side-by side displays illustrated above in FIG. 8a and 8b.

In determining which initial proposals proceed to the next step, the central server may use many different schemes based upon the users' rankings. For example, in one embodiment, the three initial proposals receiving the most number of first place votes proceed to the next "round." Alternatively, the central server may compute an average ranking value for each initial proposal, based upon the mean, or median user ranking. Then, based upon this average ranking value, the central server may select a number of initial proposals having the highest average ranking value to proceed to the next "round." Other types of schemes are easily foreseeable and are included in alternative embodiments of the present invention.

FIG. 8a and b further illustrate a notebook icon 480. Notebook icon 480 enables users to store and "borrow" ideas from the other proposals the user has reviewed. When reviewing a proposal, if the user likes an idea from another proposal, the user uses a conventional pointing device, such as a mouse, to select a statement from one of the proposals, and drags the statement to notebook icon 480. When the user subsequently selects notebook icon 480, during any of the steps described herein, the list of the statements saved is returned. As also illustrated, the ranking process may have a set time limit to respond.

Figure 9:
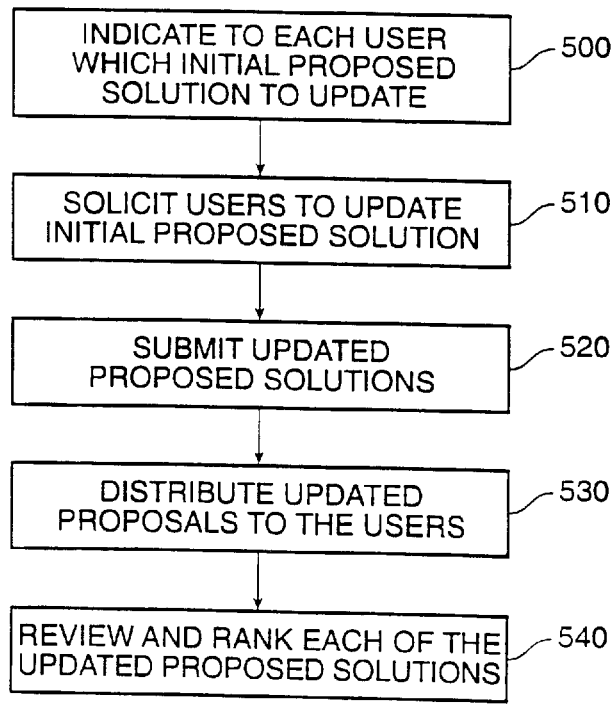
FIG. 9 illustrates a more detailed flow diagram of step 310 in FIG. 3.

FIG. 9 illustrates a more detailed flow diagram of step 310 in FIG. 3. FIG. 9 includes steps 500–540.

Initially the central server notifies each user as to the user's highest ranked initial proposed solution that survived to this stage, step 500. The central server then solicits the user to update or modify that proposal, step 510.

Next, the users revise and submit updated proposals to the central server, step 520. Typically it is envisioned that users will borrow "good" ideas (statements) from other proposals the users have reviewed, and incorporate them into the proposal. Because typically more than one user will update a particular initial proposed solution, more than one updated proposal for each initial proposed solution will exist.

Figure 10:
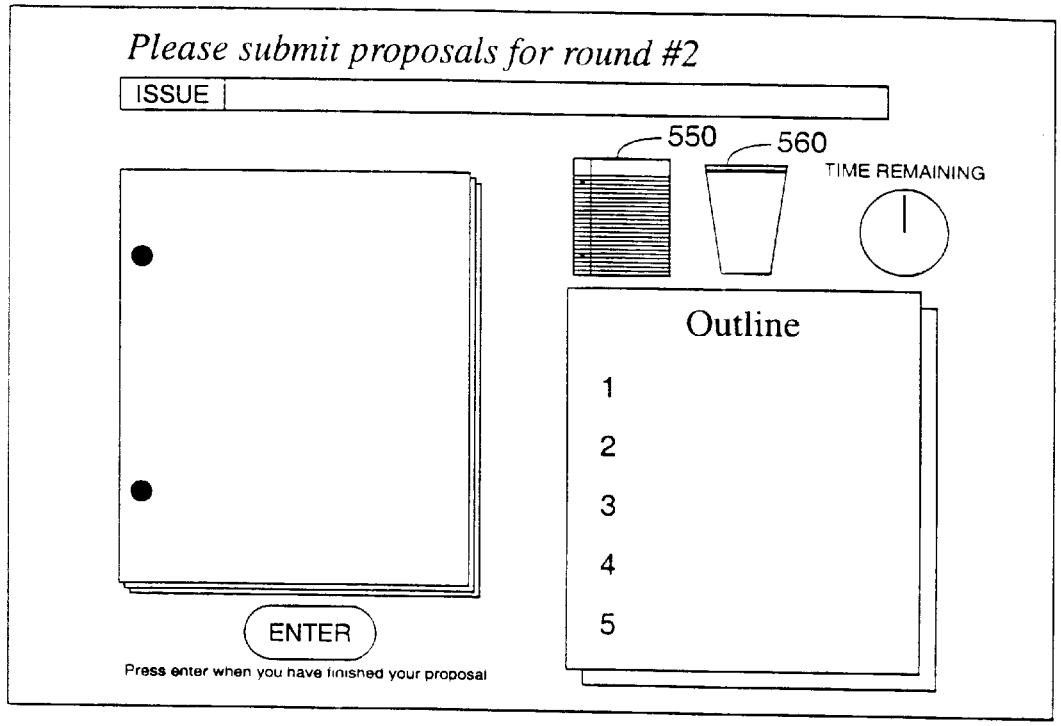
FIG. 10 illustrates a display screen of a preferred embodiment of the present invention.

FIG. 10 illustrates a display screen of a preferred embodiment of the present invention. The user may add new statements via conventional means such as a computer keyboard. Further, the user may copy ideas previously stored in notebook 550 by dragging statements onto the current proposal, and the user may throw away statements by dragging statements onto trash can 560.

Referring back to FIG. 9, after the users have submitted updated proposals, the central server distributes the different updated proposals for each particular initial proposal, step 520. Preferably the central server distributes the updated proposals for an initial proposal only to those users that updated that particular initial proposal, step 530. If a user is the only user updating a particular initial proposal, the user may further update the proposal at this stage.

Figure 11:
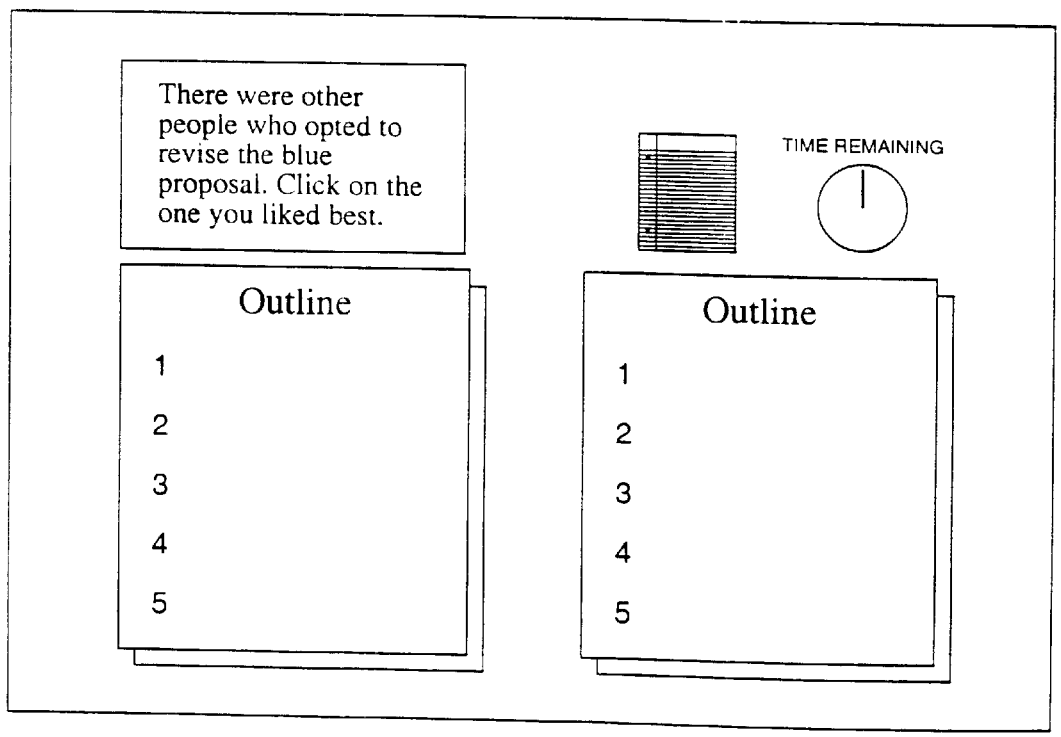
FIG. 11 illustrates a display screen of a preferred embodiment of the present invention.

Next, each user reviews the different updated proposals for the particular initial proposed solution and then ranks the different updated proposals, step 540. The process of ranking different updates to the same initial proposal may occur in a process similar to that described above. This is illustrated in FIG. 11 as a display screen of a preferred embodiment of the present invention.

Figure 12:
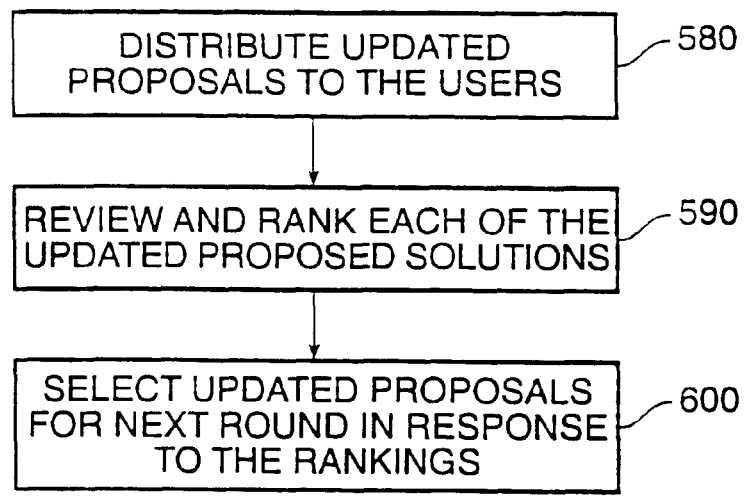
FIG. 12 illustrates a more detailed flow diagram of step 320 in FIG. 3.

FIG. 12 illustrates a more detailed flow diagram of step 320 in FIG. 3. FIG. 12 includes steps 580–600.

Based upon the user rankings, the central server selects one updated initial proposal as an updated proposal for each initial proposal. The central server then distributes updated proposals to all of the users, step 580.

After the users review each of the updated proposed solutions, the users rank each of the updated proposals, step 590. Again, based upon the users' rankings, the central server selects a number of updated proposals to proceed to the next step, step 620.

Figure 13:
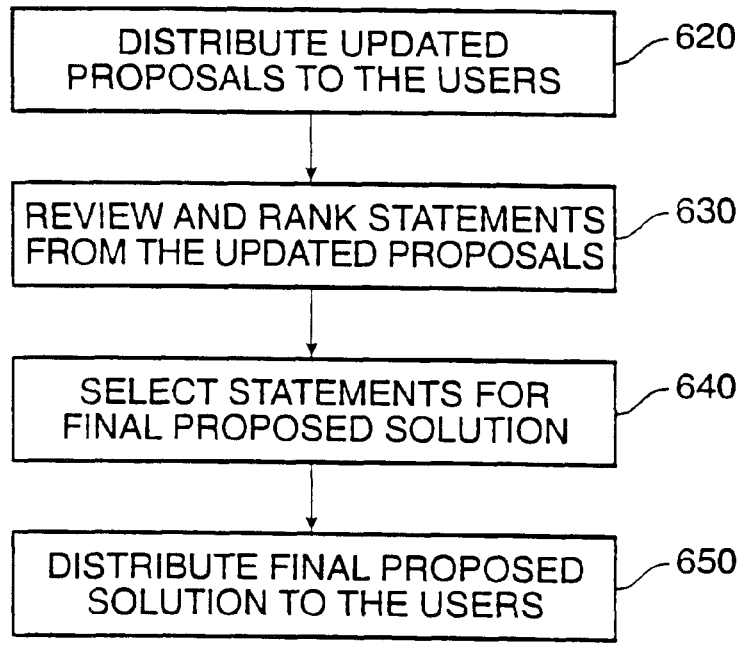
FIG. 13 illustrates a more detailed flow diagram of steps 330 and 340 in FIG. 3.

FIG. 13 illustrates a more detailed flow diagram of steps 330 and 340 in FIG. 3. FIG. 13 includes step 620–650.

Initially the central server notifies the users which proposed solutions reach this stage, step 620. Next each user reviews statements from each of the remaining proposed solutions and selects statements for the "final" proposal, step 630. Preferably the user selects some but not all of the statements. In a preferred embodiment, the central server makes the users rank the statements, as was previously described.

Figure 14:
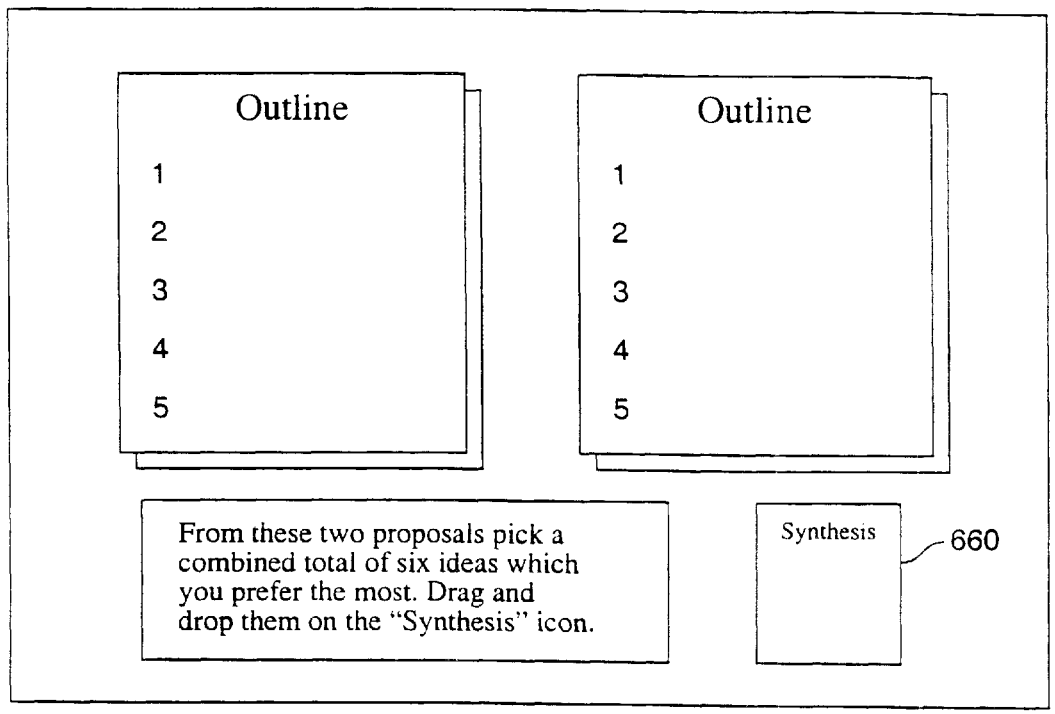
FIG. 14 illustrates a selection display screen of a preferred embodiment of the present invention.

FIG. 14 illustrates a selection display screen of a preferred embodiment of the present invention. As illustrated, the central server prompts the user to select some but not all of the statements. Preferably, the user uses the mouse to select a statement, and to drag the statement to synthesis icon 660.

Referring back to FIG. 13, based upon the users selections, the central server selects a predetermined number of statements for the "final" proposed solution, step 640. The number of statements may vary from one to all of the statements. The number of statements in this proposal is user definable, depending upon application.

Finally, the central the central server distributes the final proposed solution to the users, step 650. It is envisioned that the "final" proposed solution produced by network collaboration may simply be a working proposal for further study or a proposal for implementation.

Figure 15:
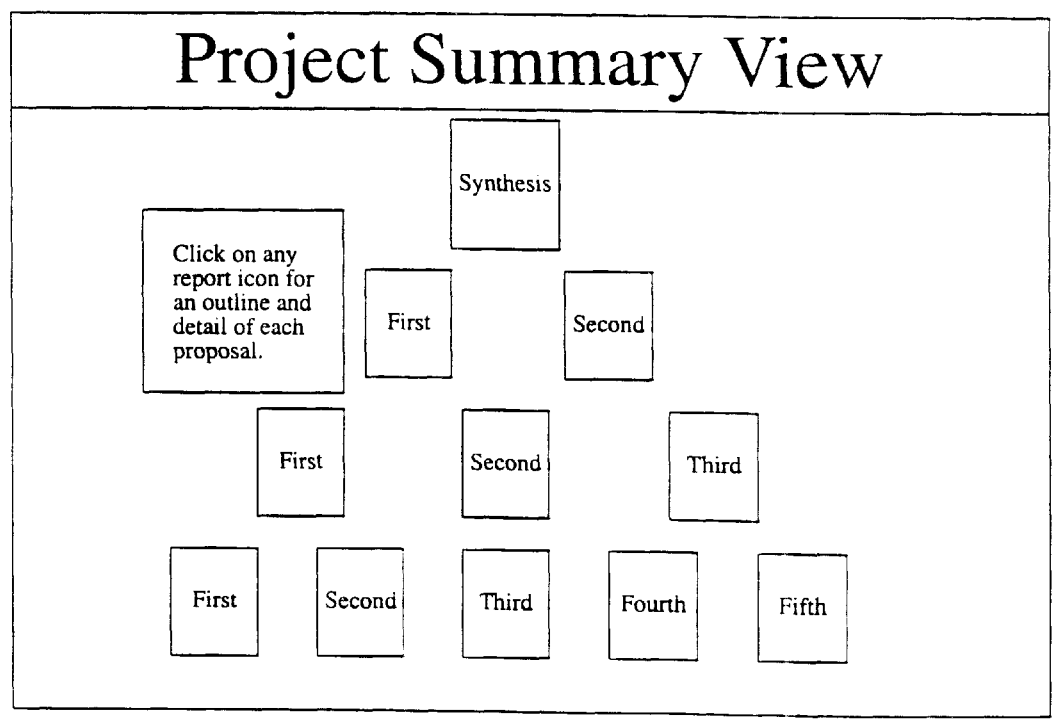
FIG. 15 illustrates an exemplary diagram of the preferred embodiment of the present invention.

FIG. 15 illustrates an exemplary diagram of the preferred embodiment of the present invention. As illustrated, in the initial round the central server receives five initial proposed solutions. From these five initial proposed solutions, the central server selects three proposals for further refinement, in response to the users' rankings. Next, the users update each of the three proposals, and the central server distributes the three updated proposals to all of the users. The users then update and rank the three updated proposals. Once two updated proposals remain, the users select statements from the two updated proposals for synthesis. The central server processes the users' rankings of the statements and then synthesizes a final proposed solution.

Conclusion

In the foregoing specification, the invention has been described with reference to specific exemplary embodiments thereof. Many changes or modifications are readily envisioned. For example, the number of proposals proceeding to subsequent rounds may be varied, depending on how quickly a decision is to be made, the users that the central server distributes proposals to, or that the central server takes rankings from may be different in each round, and the specific programming languages, network environment, and network configuration may be changed, among other changes. Further, in other embodiments, particular users may have "veto" power over proposals or statements within proposals and in other embodiments, statements can be voted upon at different stages.

The presently claimed invention applies to almost any area of decision making imaginable. For example, the proposals could be bids placed by contractors for a building contract or bids for the sales price of an object, commodity, or object as in an auction. In this case, the narrowing and refinement of proposals may be dictated by the judgments of the seller rather than the ranking of the bidders.

Also one can easily imagine the case that the proposals need not be limited to text alone. The proposals may consist of images or designs which are presented for the purpose of the collaborative designing, for example, advertisements, such as color schemes, layouts, textual or pictorial content, theme, etc., commercial designs such as logos, packaging, slogans, ergonomic design, etc., building design such as requirements, floorplans, aesthetic elements, etc. Alternatively, the proposal could be audio such as spoken text, sampled sounds, or musical notation or recorded music in the form of a audio samples, in "RealAudio" format, for example, or a MIDI file, etc. for the purpose of collaborative musical composition and/or analysis. Further the proposal could include images coordinated with audio for collaborative multimedia design, such as narration or accompanying music to a slideshow or a movie clip in the form of digital audio or video, or edit decision list (EDL) files including synchronization codes in SMTE or VITC format, for example, for controlling peripherals coupled to a computer.

The proposals could also consist of computational code in a computer language or any form of symbolic representation. Other examples of possible proposals are mathematical or logical formulae used in collaborative mathematical or logical problem solving. These examples are illustrative of the many types of collaborative projects and the various media that can be used in the proposed process. To reiterate, the presently claimed invention applies to almost any area of decision making imaginable. Further, having the central server maintain a list of actions taken by the users during the entire process may provide useful data.

The specification and drawings are, accordingly, to be regarded in an illustrative rather than a restrictive sense. It will, however, be evident that various modifications and changes may be made thereunto without departing from the broader spirit and scope of the invention as set forth in the claims.

I claim:

1. A method of controlling a computer server to enable collaboration between a plurality of users through a narrowing of statements, comprising the acts of:

storing groups of statements in a memory, each group of statements comprising at least one statement that explains a phenomena;

determining a first subset of groups from the groups of statements;

submitting the first subset of groups to a first user at a computer client;

receiving a first selection of groups from the first subset of groups from the first user;

determining a second subset of groups from the groups of statements;

submitting the second subset of groups to a second user at a computer client;

receiving a second selection of groups from the second subset of groups from the second user;

determining a third subset of groups from the groups of statements in response to the first selection of groups from the first user and the second selection of groups from the second user;

submitting the third subset of groups to a third user at a computer client;

receiving a selection of statements from the third subset of groups from the third user;

determining a proposed group of statements for explaining the phenomena, the proposed group of statements in response to the selection of statements by the third user; and submitting the final proposed group of statements to a fourth user at a computer client.

2. The method of claim 1, wherein groups from the first subset of groups are different from groups from the second subset of groups.

3. The method of claim 1, wherein at least one group of the groups of statements is included both the first subset of groups and the second subset of groups.

4. The method of claim 1, wherein each group of statements comprises one statement.

5. The method of claim 4, wherein the first selection of groups is less than all of the first subset of groups, and wherein the second selection of groups is less than all of the second subset of groups.

6. The method of claim 5, wherein the third set of groups of statements also comprises groups other than groups within the first selection of groups and the second selection of groups.

7. The method of claim 4, wherein receiving the first selection of groups also comprises receiving rankings of groups within the first selection of groups; and wherein receiving the second selection of groups also comprises receiving rankings of groups within the second selection of groups.

8. The method of claim 7, wherein determining the third subset of groups comprises selecting a predetermined number of groups from the first selection of groups and the second selection of groups in response to the rankings.

9. The method of claim 4, wherein receiving the selection of statements also comprises receiving rankings of the selections of the statements from the third user.

10. The method of claim 9, wherein determining the proposed group of statements comprises ordering the selections of the statements according to the rankings from the third user.

11. A computer server, comprising:

a processor; and a tangible media coupled to the processor, said tangible media having stored therein groups of statements, each group of statements comprising at least one statement that explains a phenomena, said tangible media having further stored therein a computer program for controlling said processor to execute processing comprising the acts of:

determining a first subset of groups from the groups of statements;

transmitting the first subset of groups to a first user at a computer client;

receiving a first selection of groups, the first selection of groups selected from the first subset of groups by the first user;

determining a second subset of groups from the groups of statements;

transmitting the second subset of groups to a second user at a computer client;

receiving a second selection of groups, the second selection of groups selected from the second subset of groups by the second user;

determining a third subset of groups from the groups of statements in response to the first selection of groups and the second selection of groups;

transmitting the third subset of groups to a third user at a computer client;

receiving a selection of statements, the selection of statements selected from statements within the third subset of groups from the third user;

determining a proposed group of statements for explaining the phenomena, the proposed group of statements determined in response to the selection of statements by the third user; and transmitting the final proposed group of statements to a fourth user.

12. The computer system of claim 11, wherein each group of statements comprises only one statement that may explain the phenomena.

13. The computer system of claim 12, wherein groups within the first subset of groups are not within the second subset of groups.

14. The computer system of claim 12, wherein the first subset of groups and the second subset of groups have a group in common.

15. The computer system of claim 12, wherein the first selection of groups excludes at least one group in the first subset of groups, and wherein the second selection of groups excludes at least one group in the second subset of groups.

16. The computer system of claim 15, wherein a group within the third set of groups of statements is not within the first selection of groups or the second selection of groups.

17. The computer system of claim 12, wherein the computer program controls the processor to execute processing further comprising:

receiving rankings of groups within the first selection of groups from the first user; and receiving rankings of groups within the second selection of groups from the second user.

18. The computer system of claim 17, wherein the act of determining the third subset of groups comprises determining the third subset of groups in response to the rankings from the first user and the rankings from the second user.

19. The computer system of claim 17, wherein the act of determining the third subset of groups comprises selecting a pre-determined number of highly ranked groups from the first selection of groups and the second selection of groups in response to the rankings from the first user and the rankings from the second user.

20. The computer system of claim 12, wherein the computer program controls the processor to execute processing further comprising:

receiving a ranking of statements of the selections of statements from the third user.

21. A computer program product embodied on a computer-readable medium including a plurality of statements, each statement explaining a phenomena, the computer program product controlling a computer server to execute processing comprising the acts of:

determining a first subset of statements from the plurality of statements;

transmitting the first subset of statements to a first user at a computer client;

receiving a first selection of statements, the first selection of statements being selected from the first subset of statements by the first user;

determining a second subset of statements from the plurality of statements;

transmitting the second subset of statements to a second user at a computer client;

receiving a second selection of statements, the second selection of statements being selected from the second subset of statements by the second user;

determining a third subset of statements from the plurality of statements in response to the first selection of statements and to the second selection of statements;

transmitting the third subset of statements to a third user at a computer client;

receiving a third selection of statements, the third selection of statements being selected from the third subset of statements by the third user;

determining a proposed list of statements that explain the phenomena, the proposed list of statements being determined in response to the third selection of statements by the third user; and transmitting the proposed list of statement to a fourth user.

22. The computer program product of claim 21, wherein statements within the first subset of statements are not within the second subset of statements.

23. The computer program product of claim 21, wherein the first subset of statements and the second subset of statements have at least one statement in common.

24. The computer program product of claim 21, wherein the computer program product controls the computer server to execute processing further comprising:

receiving a new statement from the first user.

25. The computer program product of claim 24, wherein the second subset of statements includes the new statement.

26. The computer program product of claim 21, wherein a statement within the third subset of statements is not within the first selection of statements nor within the second selection of statements.

27. The computer program product of claim 21, wherein the computer program product controls the computer server to execute processing further comprising:

receiving rankings of statements within the first selection of statements from the first user; and receiving rankings of statements within the second selection of statements from the second user.

28. The computer program product of claim 27, wherein the act of determining the third subset of statements comprises determining the third subset of statements in response to the rankings from the first user and the rankings from the second user.

* * * * *